(12) United States Patent
Sandoval et al.

(10) Patent No.: US 7,187,683 B1
(45) Date of Patent: Mar. 6, 2007

(54) STATISTICS DATA COLLECTION MECHANISM FOR DISTRIBUTED, HIGH-SPEED DATA PROCESSING ENVIRONMENTS

(75) Inventors: John Sandoval, Santa Clara, CA (US); Virendra Patel, Fremont, CA (US); Frederic Mathieu, San Francisco, CA (US); Jayakumar Jayakumar, San Jose, CA (US); Rohit Sharma, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 852 days.

(21) Appl. No.: 10/013,386

(22) Filed: Dec. 7, 2001

(51) Int. Cl.
*H04L 12/28* (2006.01)

(52) U.S. Cl. .................................... 370/410
(58) Field of Classification Search ................ 370/409, 370/399, 392, 428, 356, 389, 474, 395.2, 370/395.3, 395.21, 395.71, 410
See application file for complete search history.

(56) References Cited

U.S. PATENT DOCUMENTS

| | | | |
|---|---|---|---|
| 5,909,564 A * | 6/1999 | Alexander et al. | 710/316 |
| 5,920,705 A * | 7/1999 | Lyon et al. | 709/240 |
| 6,697,371 B1 * | 2/2004 | Liang et al. | 370/401 |
| 6,868,152 B2 * | 3/2005 | Statham et al. | 379/265.02 |

* cited by examiner

*Primary Examiner*—Chi Pham
*Assistant Examiner*—Alexander O. Boakye
(74) *Attorney, Agent, or Firm*—Blakely, Sokoloff, Taylor & Zafman LLP

(57) ABSTRACT

A statistics data collection mechanism for distributed, high-speed data processing environments is described. According to one embodiment, an update message containing statistics data related to a data packet carried along a virtual connection is assembled and the update message is then transmitted to a statistics collection engine for further processing. According to another embodiment, the update message is received from one or more processing devices, and multiple counters are then updated to store the statistics data.

71 Claims, 6 Drawing Sheets

STATISTICS DATA COLLECTION MECHANISM FOR DISTRIBUTED, HIGH-SPEED DATA PROCESSING ENVIRONMENTS

FIELD OF THE INVENTION

The present invention relates generally to data processing and, more particularly, to a statistics data collection mechanism for distributed, high-speed data processing environments.

BACKGROUND OF THE INVENTION

Statistics data is a key part of any data processing system. Due to faster data circuit rates, data processing is often distributed across multiple processing devices.

FIG. 1 is a block diagram of an exemplary data processing system. As illustrated in FIG. 1, the data processing system 100 includes a management plane, for example a central processing unit (CPU) 101 coupled to multiple processing devices (D1–D4) 102–105. Processing devices 102–105 process data and store statistics data S1–S4 in respective associated memory devices (not shown). The CPU 101 reads the memory associated with each processing device 102–105 and retrieves the corresponding statistics data S1–S4, sequentially or according to a priority mechanism, such as a round robin mechanism.

As the number of circuits and the amount of statistics data per circuit increase, the CPU 101 needs to collect statistics data at a higher frequency. However, fast collection of statistics data is hampered by the comparatively slower interfaces to the processing devices 102–105 and by the fact that the CPU 101 needs to poll each device in order to collect statistics data, irrespective of the availability of statistics data in that particular device, possibly resulting in bandwidth waste.

SUMMARY OF THE INVENTION

A statistics data collection mechanism for distributed, high-speed data processing environments is described. According to one embodiment, an update message containing statistics data related to a data packet carried along a virtual connection is assembled and the update message is then transmitted to a statistics collection engine for further processing. According to another embodiment, the update message is received from one or more processing devices, and multiple counters are then updated to store the statistics data.

Other features and advantages of the present invention will be apparent from the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

According to embodiments described herein, a statistics collection mechanism for distributed, high-speed data processing environments is described. According to one embodiment, an update message containing statistics data related to a data packet carried along a virtual connection is assembled and the update message is then transmitted to a statistics collection engine for further processing. According to another embodiment, the update message is received from one or more processing devices, and multiple counters are then updated to store the statistics data. In the embodiments described herein, the statistics collection mechanism helps to provide reduced management plane (CPU) utilization for statistics data collection. In addition, the methods to collect statistics data result in a reduced number of statistics message exchanges between the CPU and associated processing devices. Furthermore, the statistics collection mechanism helps to eliminate unnecessary polling of the processing devices, resulting in increased efficiency in the collection of statistics data.

Figure 1:
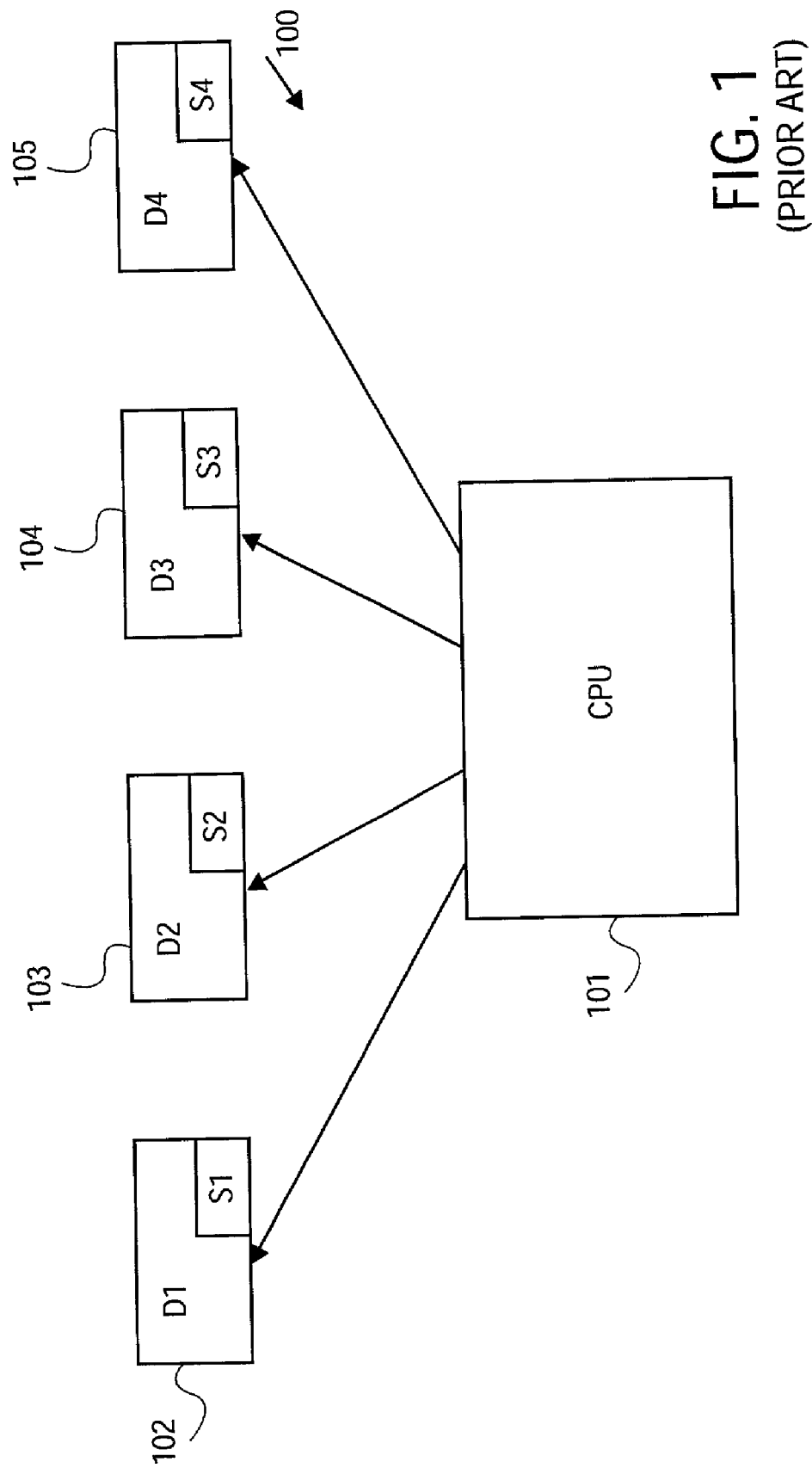
FIG. 1 is a block diagram of an exemplary data processing system.
Figure 2:
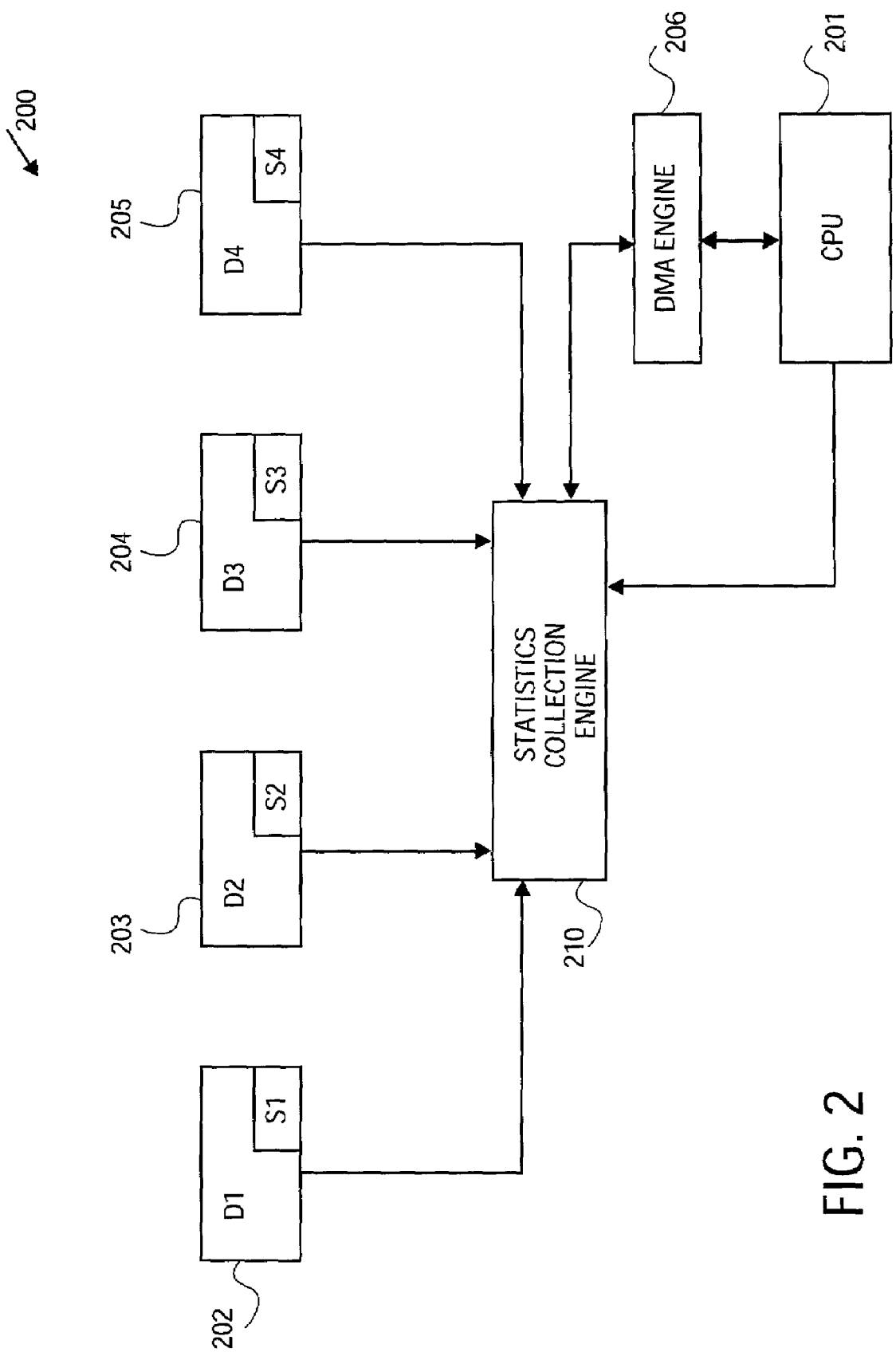
FIG. 2 is a block diagram of one embodiment of a system to collect statistics data in a distributed high-speed data processing environment.

FIG. 2 is a block diagram of one embodiment of a system 200 to collect statistics data in a distributed high-speed data processing environment. As illustrated in FIG. 2, in one embodiment, the system 200 includes a statistics collection engine 210, which interacts with multiple processing devices, of which processing devices (D1–D4) 202–205 are shown. The system 200 further includes a central processing unit (CPU) 201, which interacts with the statistics collection engine 210, either directly or indirectly through a Direct Memory Access (DMA) engine 206.

Each processing device 202–205 is a programmable hardware and/or software device to receive data traffic carried along multiple virtual connections, for example data packets, to process the data packets to generate statistics data, and to transmit the statistics data to the statistics collection engine 210. For one embodiment, statistics data is stored in a memory device (not shown) coupled to each processing device 202–205. The statistics collection engine 210 is a programmable hardware and/or software module to receive the statistics data and to update multiple counters residing in a memory. For one embodiment, the statistics collection engine 210 updates a predetermined number of counters corresponding to the generated statistics data. Finally, the CPU 201 communicates with the statistics collection engine 210 to retrieve the statistics data. All the above interactions and processes will be described in further detail below.

Figure 3:
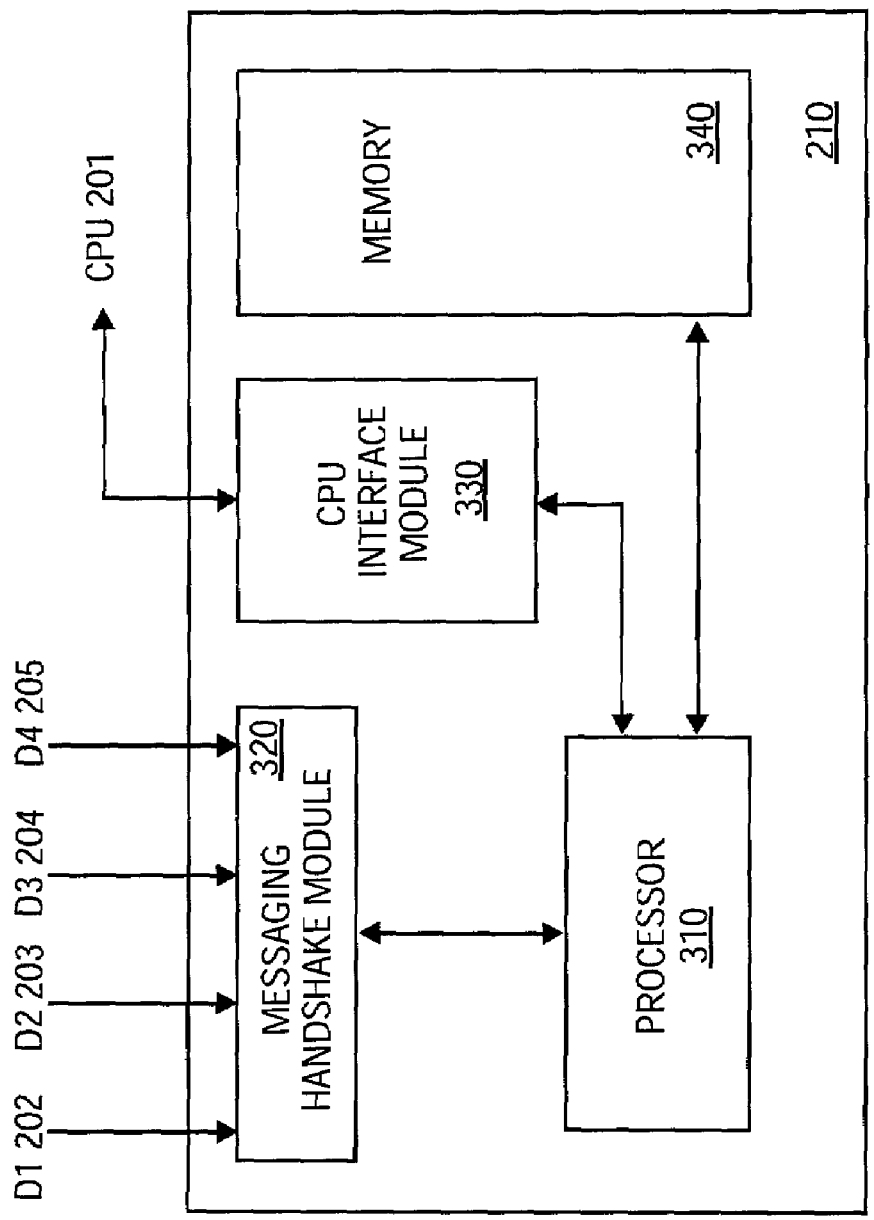
FIG. 3 is a block diagram of one embodiment of a statistics collection engine in the system.

FIG. 3 is a block diagram of one embodiment of a statistics collection engine 210 in the system 200. As illustrated in FIG. 3, in one embodiment, the statistics collection engine 210 includes a processor 310 coupled to a messaging handshake module 320, a CPU interface module 330, and a memory 340. The statistics collection engine 210 communicates with each processing device 202–205 through the messaging handshake module 320. The statistics collection engine 210 further interacts with the CPU 201 through the CPU interface module 330.

In one embodiment, each processing device 202–205 receives the data packets carried on multiple virtual connections and processes each data packet to generate statistics data S1–S4, respectively. Each virtual connection includes a connection identifier, which identifies the particular virtual connection. Each data packet has a length characterized by a data packet byte length value and contains data to be processed by the corresponding processing device 202–205.

Figure 4:
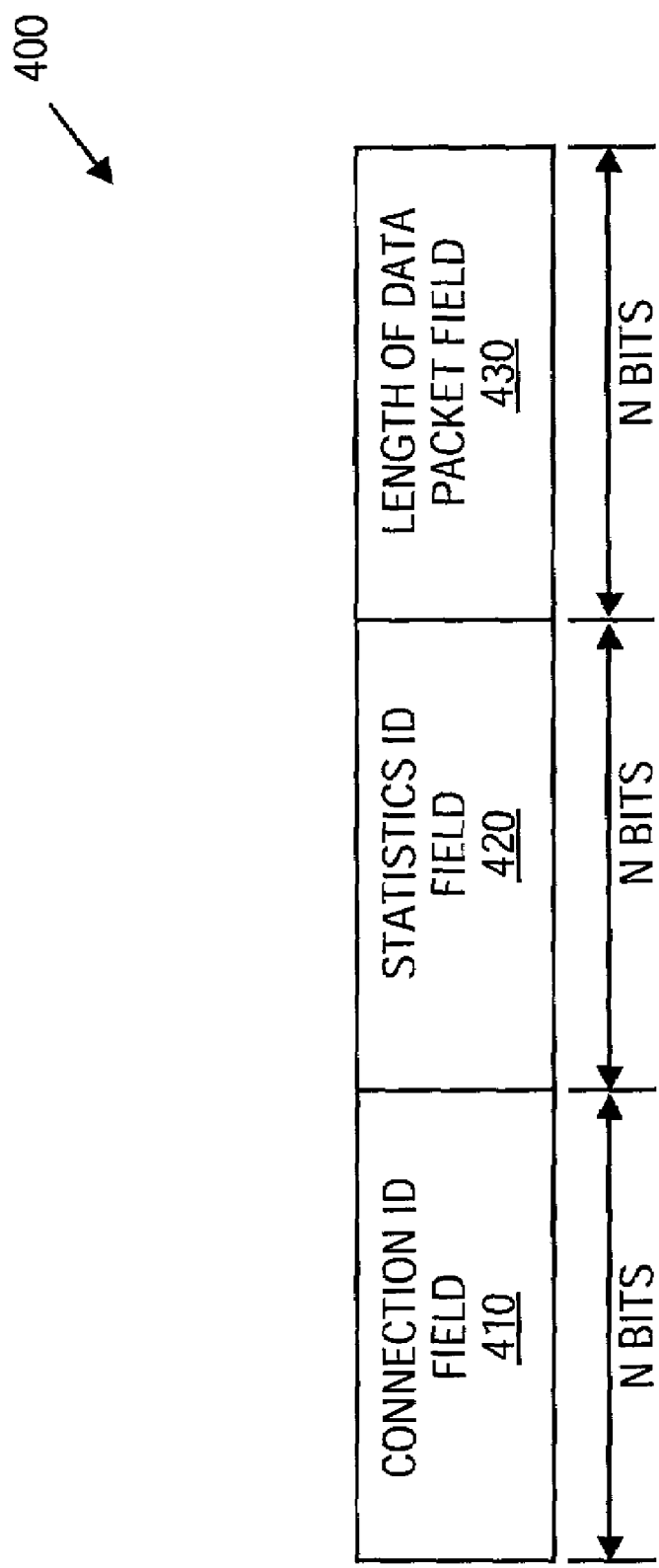
FIG. 4 is a block diagram of one embodiment of an update message assembled and transmitted within the system.

After the statistics data is generated, each processing device 202–205 assembles an update message for each processed data packet, the update message to be transmitted to the statistics collection engine 210 for further processing. One embodiment of an update message 400 is illustrated in FIG. 4. Referring to FIG. 4, the update message 400 includes a connection identification (ID) field 410 containing the virtual connection identifier corresponding to the particular virtual connection, which carried the data packet. The update message 400 further includes a statistics identification field 420 containing multiple statistics identifiers corresponding to the generated statistics data. Finally, the update message 400 includes a length of data packet field 430 containing the data packet byte length value of the processed data packet.

In one embodiment, the connection ID field 410, the statistics identification field 420, and the length of data packet field 430 each contain N bits of information, where N is a predetermined number of statistics per processing device 202–205. In one embodiment, each bit in the statistics identification field 420 corresponds to a different value of statistics data. For example, a bit at position 0 may correspond to a value representing transmitted connection frames, a bit at position 1 may correspond to a value representing transmitted connection bytes, a bit at position 2 may correspond to a value representing received connection frames, and so on.

In one embodiment, each processing device 202–205 inserts the virtual connection identifier in the connection identification field 410, inserts the statistics identifiers in the statistics identification field 420 to indicate the generated statistics data, and further inserts the data packet byte length value of the processed data packet in the length of data packet field 430.

Subsequent to the assembly of the update message 400, each processing device 202–205 requests a communication channel with the statistics collection engine 210 to transmit the update message 400. The statistics collection engine 210 receives the requests from the processing device 202–205 through the messaging handshake module 320 and grants one or more communication channels to one or more processing devices 202–205. In one embodiment, the messaging handshake module 320 is a programmable hardware and/or software module to interface between the processing devices 202–205 and the statistics collection engine 210.

Once the selected processing devices 202–205 receive approval from the statistics collection engine 210 to transmit the update message 400, each corresponding update message 400 is transmitted to the statistics collection engine 210 via the messaging handshake module 320. The processor 310 within the statistics collection engine 210 retrieves the statistics data from the statistics identifiers within the statistics identification field 420 and updates multiple counters stored within the memory 340, for example, a predetermined number of counters (not shown) corresponding to the statistics data. In one embodiment, the memory 340 can be, for example, a random access memory (RAM) or any other known type of dynamic storage device.

For example, a bit within the statistics identification field 420 may have a 0 (zero) value, indicating that the corresponding counter does not need to be updated, or a 1 (one) value, indicating that statistics data has been transmitted and that the corresponding counter needs to be updated. If a bit corresponding to a statistics identifier has a 1 (one) value, then a corresponding counter within memory 340 is updated with a counter value. If the bit for the particular counter is set, based on the nature of the counter, the processor 310 increments the counter value by 1, e.g., for the transmitted connection frames, or by a data packet byte length value within the length of data packet field 430, e.g., for the transmitted connection bytes.

After the counters are updated to store the statistics data, the CPU 201 can access the statistics collection engine 210 to retrieve the statistics data from the memory 340. In one embodiment, the CPU 201 communicates with the statistics collection engine 210 via the CPU interface module 330 and transfers statistics data directly from the memory 340. Alternatively, the statistics collection engine 210 may transfer statistics data to the DMA engine 206. The DMA engine 206 is a programmable hardware module to retrieve the statistics data from the statistics collection engine 210, based on a request from the CPU 201, and to transfer the statistics data to the CPU 201, thereby allowing the CPU 201 to perform other operations.

Figure 5:
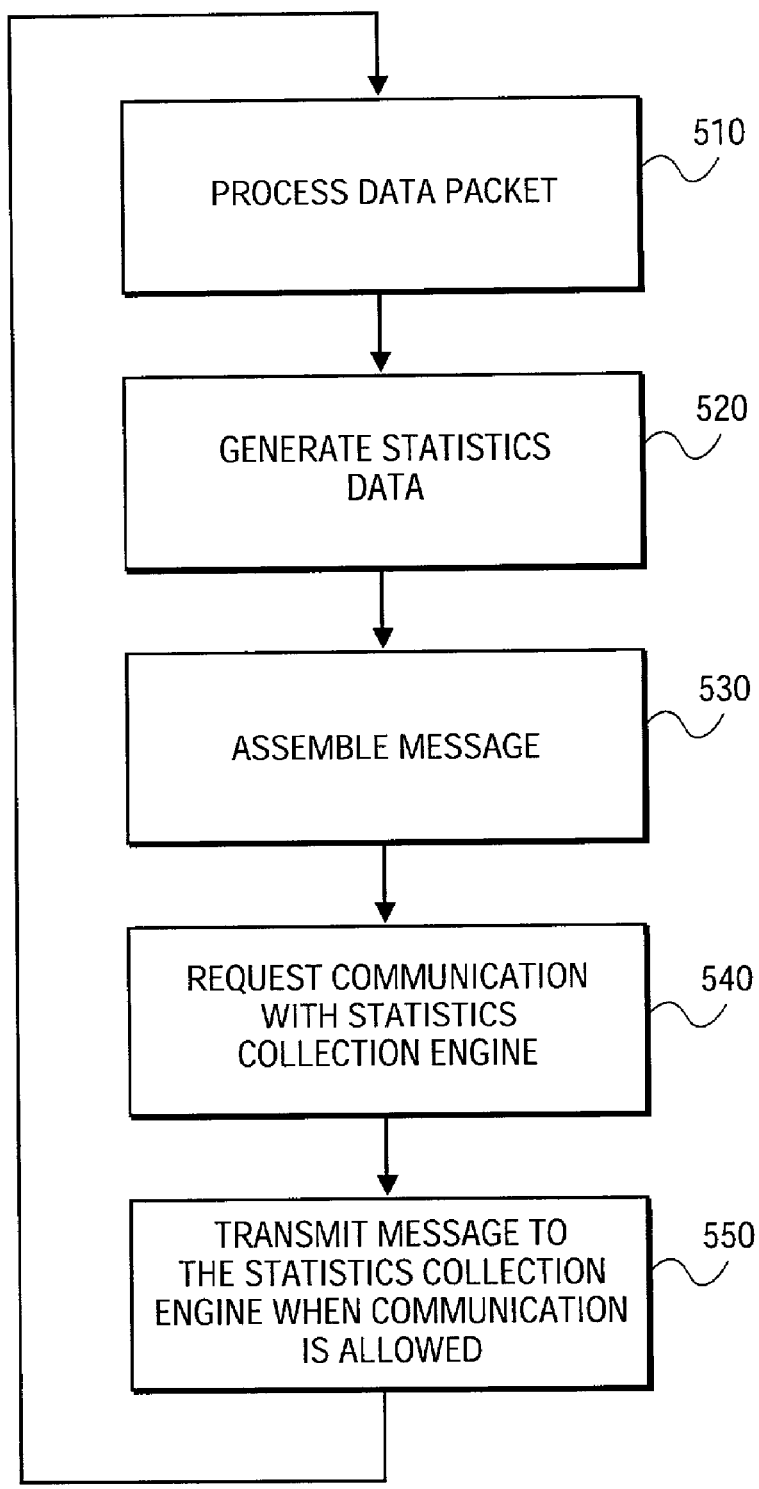
FIG. 5 is a flow diagram of one embodiment of a method to collect statistics data in a distributed high-speed data processing environment.

FIG. 5 is a flow diagram of one embodiment of a method to collect statistics data in a distributed high-speed data processing environment. As illustrated in FIG. 5, at processing block 510, a data packet received along a virtual connection is processed. At processing block 520, statistics data is generated from the processed data packet.

At processing block 530, an update message 400 is assembled, the update message 400 containing the generated statistics data. At processing block 540, a communication channel with the statistics collection engine 210 is requested to transmit the update message 400.

Finally, at processing block 550, the update message 400 is transmitted to the statistics collection engine 210 when the communication is allowed and approval to transmit the update message 400 is received from the statistics collection engine 210. Subsequently, processing blocks 510 through 550 are repeated.

Figure 6:
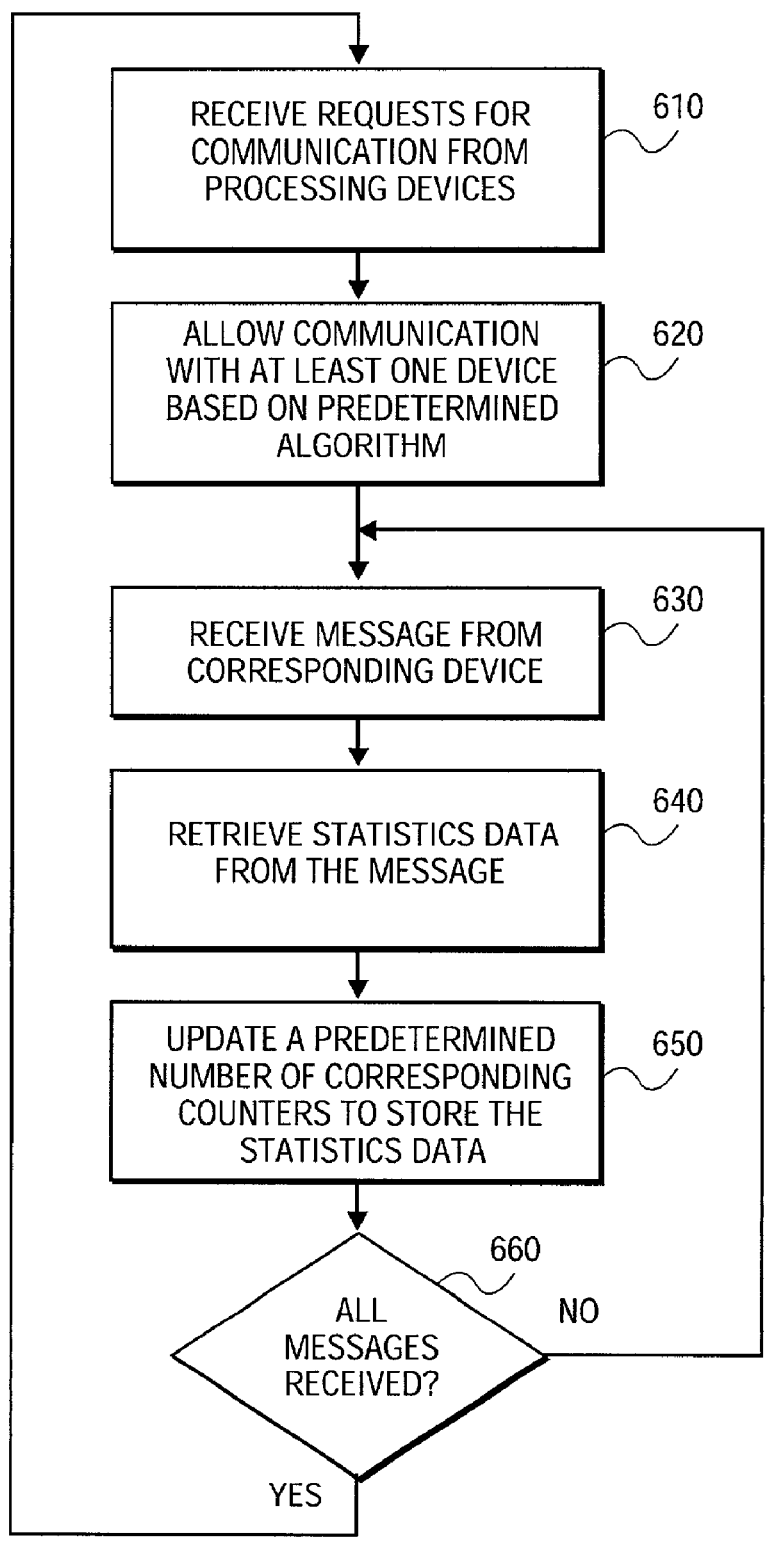
FIG. 6 is a flow diagram of another embodiment of the method to collect statistics data.

FIG. 6 is a flow diagram of another embodiment of the method to collect statistics data. As illustrated in FIG. 6, at processing block 610, requests for communication channels are received from multiple processing devices 202–205. At processing block 620, communication with one or more processing devices 202–205 is allowed and corresponding communication channels are granted based on a predetermined algorithm, for example a known fairness algorithm.

At processing block 630, an update message 400 is received from a corresponding processing device 202–205. At processing block 640, statistics data is retrieved from the update message 400. At processing block 650, a predetermined number of corresponding counters stored in a memory 340 are updated to store the statistics data.

At processing block 660, a decision is made whether all update messages 400 have been received. If all update messages 400 have been received, processing blocks 610 through 660 are repeated. Otherwise, if not all update messages 400 have been received, processing blocks 630 through 660 are repeated.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information. While embodiments of the present invention will be described with reference to the Internet and the World Wide Web, the system and method described herein is equally applicable to other network infrastructures or other data communication systems.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
   assembling an update message containing statistics data related to a data packet carried along a virtual connection, wherein said assembling further comprises
      inserting a virtual connection identifier corresponding to said virtual connection in a connection identification field within said update message,
      inserting a plurality of statistics identifiers in a statistics identification field within said update message, and
      inserting a data packet byte length value of said data packet in a length of data packet field within said update message; and
   transmitting said update message to a statistics collection engine for further processing that includes retrieving said statistics data from said update message and updating a plurality of counters to store said statistics data.

2. The method according to claim 1, further comprising:
   processing said data packet carried along said virtual connection; and
   generating said statistics data for said update message.

3. The method according to claim 1, wherein said transmitting further comprises:
   requesting a communication channel with said statistics collection engine to transmit said update message; and
   receiving approval to transmit said update message from said statistics collection engine.

4. A method comprising:
   receiving an update message from at least one processing device, said update message containing statistics data related to a data packet carried along a virtual connection and received within said at least one processing device;
   updating a plurality of counters to store said statistics data and to update at least one counter with a one value if said statistics data indicates a change in a number of connection frames transmitted along said virtual connection; and
   granting access to a DMA engine to retrieve said statistics data from each counter of said plurality of counters.

5. The method according to claim 4, wherein said updating further comprises:
   retrieving said statistics data from said update message.

6. The method according to claim 4, wherein said receiving further comprises:
   receiving requests for communication channels from a plurality of processing devices; and
   granting at least one communication channel to said at least one processing device based on a predetermined algorithm.

7. The method according to claim 4, wherein said update message comprises:
   a virtual connection identifier corresponding to said virtual connection in a connection identification field;
   a plurality of statistics identifiers in a statistics identification field; and
   a data packet byte length value of said data packet in a length of data packet field.

8. The method according to claim 4, further comprising:
   granting access to a central processing unit to retrieve said statistics data from each counter of said plurality of counters.

9. The method according to claim 4, wherein said updating further comprises:
   updating at least one counter with a data packet byte length value if said statistics data indicates a change in a number of connection bytes transmitted along said virtual connection.

10. An apparatus comprising:
    means for assembling an update message containing statistics data related to a data packet carried along a virtual connection;
    means for inserting a virtual connection identifier corresponding to said virtual connection in a connection identification field within said update message;
    means for inserting a plurality of statistics identifiers in a statistics identification field within said update message;
    means for inserting a data packet byte length value of said data packet in a length of data packet field within said update message; and
    means for transmitting said update message to a statistics collection engine for further processing that includes retrieving said statistics data from said update message and updating a plurality of counters to store said statistics data.

11. The apparatus according to claim 10, further comprising:
    means for processing said data packet carried along said virtual connection; and
    means for generating said statistics data for said update message.

12. The apparatus according to claim 10, further comprising:
    means for requesting a communication channel with said statistics collection engine to transmit said update message; and
    means for receiving approval to transmit said update message from said:
    statistics collection engine.

13. An apparatus comprising:
    means for receiving an update message from at least one processing device, said update message containing statistics data related to a data packet carried along a virtual connection and received within said at least one processing device;
    means for updating a plurality of counters to store said statistics data;
    means for granting access to a DMA engine to retrieve said statistics data from each counter of said plurality of counters; and means for updating at least one counter with a one value if said statistics data indicates a change in a number of connection frames transmitted along said virtual connection.

14. The apparatus according to claim 13, further comprising:
means for retrieving said statistics data from said update message.

15. The apparatus according to claim 13, further comprising:
means for receiving requests for communication channels from a plurality of processing devices; and
means for granting at least one communication channel to said at least one processing device based on a predetermined algorithm.

16. The apparatus according to claim 13, wherein said update message comprises:
a virtual connection identifier corresponding to said virtual connection in a connection identification field;
a plurality of statistics identifiers in a statistics identification field; and
a data packet byte length value of said data packet in a length of data packet field.

17. The apparatus according to claim 13, further comprising:
means for granting access to a central processing unit to retrieve said statistics data from each counter of said plurality of counters.

18. The apparatus according to claim 13, further comprising:
means for updating at least one counter with a data packet byte length value if said statistics data indicates a change in a number of connection bytes transmitted along said virtual connection.

19. A computer readable medium encoded with computer executable instructions, which, when executed in a processing system, cause said processing system to perform a method comprising:
assembling an update message containing statistics data related to a data packet carried along a virtual connection, wherein said assembling further comprises
inserting a virtual connection identifier corresponding to said virtual connection in a connection identification field within said update message,
inserting a plurality of statistics identifiers in a statistics identification field within said update message, and
inserting a data packet byte length value of said data packet in a length of data packet field within said update message; and
transmitting said update message to a statistics collection engine for further processing that includes retrieving said statistics data from said update message and updating a plurality of counters to store said statistics data.

20. The computer readable medium according to claim 19, wherein said method further comprises:
processing said data packet carried along said virtual connection; and
generating said statistics data for said update message.

21. The computer readable medium according to claim 19, wherein said transmitting further comprises:
requesting a communication channel with said statistics collection engine to transmit said update message; and
receiving approval to transmit said update message from said statistics collection engine.

22. A computer readable medium encoded with computer executable instructions, which, when executed in a processing system, cause said processing system to perform a method comprising:
receiving an update message from at least one processing device, said update message containing statistics data related to a data packet carried along a virtual connection and received within said at least one processing device;
updating a plurality of counters to store said statistics data and to update at least one counter with a one value if said statistics data indicates a change in a number of connection frames transmitted along said virtual connection; and
granting access to a DMA engine to retrieve said statistics data from each counter of said plurality of counters.

23. The computer readable medium according to claim 22, wherein said updating further comprises:
retrieving said statistics data from said update message.

24. The computer readable medium according to claim 22, wherein said receiving further comprises:
receiving requests for communication channels from a plurality of processing devices; and
granting at least one communication channel to said at least one processing device based on a predetermined algorithm.

25. The computer readable medium according to claim 22, wherein said update message comprises:
a virtual connection identifier corresponding to said virtual connection in a connection identification field;
a plurality of statistics identifiers in a statistics identification field; and
a data packet byte length value of said data packet in a length of data packet field.

26. The computer readable medium according to claim 22, wherein said method further comprises:
granting access to a central processing unit to retrieve said statistics data from each counter of said plurality of counters.

27. The computer readable medium according to claim 22, wherein said updating further comprises:
updating at least one counter with a data packet byte length value if said statistics data indicates a change in a number of connection bytes transmitted along said virtual connection.

28. A system comprising:
at least one processing device to assemble an update message containing statistics data related to a data packet carried along a virtual connection; and
a statistics collection engine coupled to said at least one processing device to receive said update message,
update a plurality of counters to store said statistics data,
grant access to a DMA engine coupled to said statistics collection engine to retrieve said statistics data from each counter of said plurality of counter, and
update at least one counter of said plurality of counters with a one value if said statistics data indicates a change in a number of connection frames transmitted along said virtual connection.

29. The system according to claim 28, wherein said statistics collection engine further retrieves said statistics data from said update message.

30. The system according to claim 28, wherein said statistics collection engine further receives requests for communication channels from a plurality of processing devices and grants at least one communication channel to said at least one processing device from said plurality of processing devices based on a predetermined algorithm.

31. The system according to claim 28, wherein said update message comprises:
 a virtual connection identifier corresponding to said virtual connection in a connection identification field;
 a plurality of statistics identifiers in a statistics identification field; and
 a data packet byte length value of said data packet in a length of data packet field.

32. The system according to claim 31, wherein said at least one processing device further inserts said virtual connection identifier in said connection identification field, inserts said plurality of statistics identifiers in said statistics identification field, and inserts said data packet byte length value in said length of data packet field.

33. The system according to claim 28, wherein said statistics collection engine further grants access to a central processing unit coupled to said statistics collection engine to retrieve said statistics data from each counter of said plurality of counters.

34. The system according to claim 28, wherein said statistics collection engine further updates at least one counter of said plurality of counters with a data packet byte length value if said statistics data indicates a change in a number of connection bytes transmitted along said virtual connection.

35. The system according to claim 28, wherein said at least one processing device further processes said data packet and generates said statistics data for said update message.

36. An apparatus comprising:
 a messaging module to receive an update message containing statistics data, said update message being assembled by at least one processing device coupled to said messaging module;
 a memory having stored thereon a plurality of counters;
 a processor coupled to said memory and said messaging module to update said plurality of counters to store said statistics data and to update at least one counter of said plurality of counters with a one value if said statistics data indicates a change in a number of connection frames transmitted along said virtual connection; and
 an interface module coupled to said processor and to a DMA engine, said processor granting access to said DMA engine to retrieve said statistics data from each counter of said plurality of counters.

37. The apparatus according to claim 36, wherein said processor further retrieves said statistics data from said update message.

38. The apparatus according to claim 36, wherein said messaging module further receives requests for communication channels from a plurality of processing devices and grants at least one communication channel to said at least one processing device from said plurality of processing devices based on a predetermined algorithm.

39. The apparatus according to claim 36, wherein said update message further comprises:
 a virtual connection identifier corresponding to said virtual connection in a connection identification field;
 a plurality of statistics identifiers in a statistics identification field; and
 a data packet byte length value of said data packet in a length of data packet field.

40. The apparatus according to claim 39, wherein said at least one processing device further inserts said virtual connection identifier in said connection identification field, inserts said plurality of statistics identifiers in said statistics identification field, and inserts said data packet byte length value in said length of data packet field.

41. The apparatus according to claim 36, further comprising an interface module coupled to said processor and to a central processing unit, said processor granting access to said central processing unit to retrieve said statistics data from each counter of said plurality of counters.

42. The apparatus according to claim 36, wherein said processor further updates at least one counter of said plurality of counters with a data packet byte length value if said statistics data indicates a change in a number of connection bytes transmitted along said virtual connection.

43. The apparatus according to claim 36, wherein said at least one processing device further processes said data packet and generates said statistics data for said update message.

44. A method comprising:
 receiving requests for communication channels from a plurality of processing devices;
 granting at least one communication channel to at least one processing device based on a predetermined algorithm;
 receiving an update message from said at least one processing device, said update message containing statistics data related to a data packet carried along a virtual connection and received within said at least one processing device; and
 updating a plurality of counters to store said statistics data and to update at least one counter with a one value if said statistics data indicates a change in a number of connection frames transmitted along said virtual connection.

45. The method according to claim 44, wherein said update message comprises:
 a virtual connection identifier corresponding to said virtual connection in a connection identification field;
 a plurality of statistics identifiers in a statistics identification field; and
 a data packet byte length value of said data packet in a length of data packet field.

46. The method according to claim 44, wherein said updating further comprises:
 updating at least one counter with a data packet byte length value if said statistics data indicates a change in a number of connection bytes transmitted along said virtual connection.

47. A method comprising:
 receiving an update message from at least one processing device, said update message containing statistics data related to a data packet carried along a virtual connection and received within said at least one processing device;
 updating at least one counter with a data packet byte length value if said statistics data indicates a change in a number of connection bytes transmitted along said virtual connection; and
 granting access to a DMA engine to retrieve said statistics data from said at least one counter.

48. The method according to claim 47, wherein said receiving further comprises:
 receiving requests for communication channels from a plurality of processing devices; and
 granting at least one communication channel to said at least one processing device based on a predetermined algorithm.

49. The method according to claim 47, wherein said update message comprises:
a virtual connection identifier corresponding to said virtual connection in a connection identification field;
a plurality of statistics identifiers in a statistics identification field; and
a data packet byte length value of said data packet in a length of data packet field.

50. An apparatus comprising:
means for receiving requests for communication channels from a plurality of processing devices;
means for granting at least one communication channel to said at least one processing device based on a predetermined algorithm;
means for receiving an update message from said at least one processing device, said update message containing statistics data related to a data packet carried along a virtual connection and received within said at least one processing device;
means for updating a plurality of counters to store said statistics data; and
means for updating at least one counter with a one value if said statistics data indicates a change in a number of connection frames transmitted along said virtual connection.

51. The apparatus according to claim 50, wherein said update message comprises:
a virtual connection identifier corresponding to said virtual connection in a connection identification field;
a plurality of statistics identifiers in a statistics identification field; and
a data packet byte length value of said data packet in a length of data packet field.

52. The apparatus according to claim 50, further comprising:
means for updating at least one counter with a data packet byte length value if said statistics data indicates a change in a number of connection bytes transmitted along said virtual connection.

53. An apparatus comprising:
means for receiving an update message from at least one processing device, said update message containing statistics data related to a data packet carried along a virtual connection and received within said at least one processing device;
means for updating a plurality of counters to store said statistics data; and
means for updating at least one counter with a one value if said statistics data indicates a change in a number of connection frames transmitted along said virtual connection.

54. The apparatus according to claim 53, further comprising:
means for receiving requests for communication channels from a plurality of processing devices; and
means for granting at least one communication channel to said at least one processing device based on a predetermined algorithm.

55. The apparatus according to claim 53, further comprising:
means for updating at least one counter with a data packet byte length value if said statistics data indicates a change in a number of connection bytes transmitted along said virtual connection.

56. A computer readable medium encoded with computer executable instructions, which, when executed in a processing system, cause said processing system to perform a method comprising:
receiving an update message from at least one processing device, said update message containing
statistics data related to a data packet carried along a virtual connection and received within said at least one processing device,
a virtual connection identifier corresponding to said virtual connection in a connection identification field,
a plurality of statistics identifiers in a statistics identification field, and
a data packet byte length value of said data packet in a length of data packet field; and
updating a plurality of counters to store said statistics data and to update at least one counter with a one value if said statistics data indicates a change in a number of connection frames transmitted along said virtual connection.

57. The computer readable medium according to claim 56, wherein said receiving further comprises:
receiving requests for communication channels from a plurality of processing devices; and
granting at least one communication channel to said at least one processing device based on a predetermined algorithm.

58. The computer readable medium according to claim 56, wherein said updating further comprises:
updating at least one counter with a data packet byte length value if said statistics data indicates a change in a number of connection bytes transmitted along said virtual connection.

59. A system comprising:
at least one processing device to assemble an update message containing statistics data related to a data packet carried along a virtual connection; and
a statistics collection engine coupled to said at least one processing device to receive said update message and to update a plurality of counters to store said statistics data,
receive requests for communication channels from a plurality of processing devices,
grant at least one communication channel to said at least one processing device from said plurality of processing devices based on a predetermined algorithm, and
update at least one counter of said plurality of counters with a one value if said statistics data indicates a change in a number of connection frames transmitted along said virtual connection.

60. The system according to claim 59, wherein said update message comprises:
a virtual connection identifier corresponding to said virtual connection in a connection identification field;
a plurality of statistics identifiers in a statistics identification field; and
a data packet byte length value of said data packet in a length of data packet field.

61. The system according to claim 59, wherein said statistics collection engine further updates at least one counter of said plurality of counters with a data packet byte length value if said statistics data indicates a change in a number of connection bytes transmitted along said virtual connection.

62. A system comprising:
- at least one processing device to assemble an update message containing statistics data related to a data packet carried along a virtual connection,
  - a virtual connection identifier corresponding to said virtual connection in a connection identification field,
  - a plurality of statistics identifiers in a statistics identification field, and
  - a data packet byte length value of said data packet in a length of data packet field; and
- a statistics collection engine coupled to said at least one processing device to receive said update message,
  - to update a plurality of counters to store said statistics data, and
  - update at least one counter of said plurality of counters with a one value if said statistics data indicates a change in a number of connection frames transmitted along said virtual connection.

63. The system according to claim 62, wherein said statistics collection engine further receives requests for communication channels from a plurality of processing devices and grants at least one communication channel to said at least one processing device from said plurality of processing devices based on a predetermined algorithm.

64. The system according to claim 62, wherein said statistics collection engine further updates at least one counter of said plurality of counters with a data packet byte length value if said statistics data indicates a change in a number of connection bytes transmitted along said virtual connection.

65. An apparatus comprising:
- a messaging module to receive an update message containing statistics data, said update message being assembled by at least one processing device coupled to said messaging module;
- a memory having stored thereon a plurality of counters;
- a processor coupled to said memory and said messaging module to update said plurality of counters to store said statistics data and to update at least one counter of said plurality of counters with a data packet byte length value if said statistics data indicates a change in a number of connection bytes transmitted along said virtual connection; and
- an interface module coupled to said processor and to a DMA engine, said processor granting access to said DMA engine to retrieve said statistics data from each counter of said plurality of counters.

66. The apparatus according to claim 65, wherein said processor further retrieves said statistics data from said update message.

67. The apparatus according to claim 65, wherein said messaging module further receives requests for communication channels from a plurality of processing devices and grants at least one communication channel to said at least one processing device from said plurality of processing devices based on a predetermined algorithm.

68. The apparatus according to claim 65, wherein said update message further comprises:
- a virtual connection identifier corresponding to said virtual connection in a connection identification field;
- a plurality of statistics identifiers in a statistics identification field; and
- a data packet byte length value of said data packet in a length of data packet field.

69. The apparatus according to claim 68, wherein said at least one processing device further inserts said virtual connection identifier in said connection identification field, inserts said plurality of statistics identifiers in said statistics identification field, and inserts said data packet byte length value in said length of data packet field.

70. The apparatus according to claim 65, further comprising an interface module coupled to said processor and to a central processing unit, said processor granting access to said central processing unit to retrieve said statistics data from each counter of said plurality of counters.

71. The apparatus according to claim 65, wherein said at least one processing device further processes said data packet and generates said statistics data for said update message.

* * * * *